(12) United States Patent
Luo

(10) Patent No.: US 12,440,777 B2
(45) Date of Patent: Oct. 14, 2025

(54) WIRELESSLY POWERED MODULAR TOY

(71) Applicant: Leo Digital (Hong Kong) Company Limited, Hong Kong (HK)

(72) Inventor: Xiaolin Luo, Shenzhen (CN)

(73) Assignee: Leo Digital (Hong Kong) Company Limited, Hong Kong (HK)

( * ) Notice: Subject to any disclaimer, the term of this patent is extended or adjusted under 35 U.S.C. 154(b) by 243 days.

(21) Appl. No.: 18/332,278

(22) Filed: Jun. 9, 2023

(65) Prior Publication Data
US 2024/0408506 A1 Dec. 12, 2024

(51) Int. Cl.
| | |
|---|---|
| A63H 33/04 | (2006.01) |
| A63H 33/08 | (2006.01) |
| A63H 33/22 | (2006.01) |
| A63H 33/26 | (2006.01) |
| F21V 15/01 | (2006.01) |
| F21V 23/02 | (2006.01) |
| F21V 33/00 | (2006.01) |
| H02J 50/10 | (2016.01) |
| F21Y 115/10 | (2016.01) |
| G09B 23/18 | (2006.01) |

(52) U.S. Cl.
CPC ......... *A63H 33/042* (2013.01); *A63H 33/046* (2013.01); *A63H 33/086* (2013.01); *A63H 33/22* (2013.01); *A63H 33/26* (2013.01); *F21V 15/01* (2013.01); *F21V 23/02* (2013.01); *F21V 33/008* (2013.01); *H02J 50/10* (2016.02); *F21Y 2115/10* (2016.08); *G09B 23/181* (2013.01)

(58) Field of Classification Search
CPC .... A63H 33/04; A63H 33/042; A63H 33/046; A63H 33/26
See application file for complete search history.

(56) References Cited

U.S. PATENT DOCUMENTS

| | | | |
|---|---|---|---|
| 7,255,624 B2 * | 8/2007 | Daftari | A63H 33/22 446/485 |
| 7,731,558 B2 * | 6/2010 | Capriola | A63H 33/042 446/124 |
| 8,764,507 B2 * | 7/2014 | Lin | A63H 33/086 446/91 |
| 9,814,992 B2 * | 11/2017 | Hooper | A63H 3/28 |
| 10,953,339 B1 | 3/2021 | Liu | |
| 11,247,141 B2 | 2/2022 | Tusacciu | |
| 11,469,023 B2 | 10/2022 | Osipov | |
| 2006/0084357 A1 * | 4/2006 | Rosen | A63H 33/107 446/91 |
| 2007/0184722 A1 | 8/2007 | Doherty | |
| 2019/0232185 A1 | 8/2019 | Lin et al. | |
| 2022/0247218 A1 | 8/2022 | Knights et al. | |

* cited by examiner

*Primary Examiner* — John A Ricci

(57) ABSTRACT

A wirelessly powered modular toy, comprising: a power supply device configured to couple electric energy into electromagnetic waves of a preset frequency; a light-emitting body, wherein the light-emitting body comprises a first magnet, a second magnet and an induction coil, the first magnet and the second magnet are respectively positioned at a top and a bottom of the light-emitting body, an LED lamp is arranged at a top of the first magnet, and the induction coil is positioned between the first magnet and the second magnet; and wherein when the light-emitting body is placed on the power supply device, the light-emitting body receives the electromagnetic waves and converts the electromagnetic waves into electric energy to power the LED lamp.

8 Claims, 5 Drawing Sheets

WIRELESSLY POWERED MODULAR TOY

TECHNICAL FIELD

The present utility model relates to the field of educational toys for children, and in particular to a wirelessly powered modular toy.

BACKGROUND

A modular toy refers to a toy which can be divided into several modules, each of which has an independent function, similar modules can be repeatedly used and replaced in the product family, and then products with different requirements can be created through combination and configuration of the modules, thus the expandability of the toy is improved. At present, the design of the modular toy continues to mature, and various novel powered modules have been derived from various modules of the toy, for example, modules such as a circuit board, an LED lamp and a sounder are arranged in the real wood building blocks, so that the building blocks can conduct electricity after being assembled to provide image display and sound playback, thus the effect of enhancing the fun of the toy is obtained.

However, the problem of how to power such powered module becomes an important factor restricting the development of such smart modular toys. On one hand, such module needs additional infrastructure such as wiring and power supply, which greatly affects the appearance integrity of the toy, and on the other hand, the charging interface of the module is complex, and the connection reliability is reduced due to frequent plugging and unplugging. Therefore, how to realize such powered modular toy with a simple and intuitive structure has become one of the most interesting current research fields of modular toys.

Meanwhile, the modular toy itself should show some educational value besides entertainment and playability. At present, wireless powering technology has been widely applied to various fields such as industrial scenes, communication devices, household appliances and artificial intelligence. However, the demonstration toy for the technology is still absent in the modular educational toys, and the application of the technology to modular toys can develop children's innovative thinking, exercise and strengthen their practical ability, and play a major role in the breakthrough of children's scientific knowledge.

SUMMARY

A primary objective of the present utility model is to provide a wirelessly powered modular toy, which aims to simplify the powering structure and powering method of the modular toy, and solves the technical problem that the overall structure is affected by the powering structure of the existing powered toy.

The technical schemes of the present utility model are as follows.

A wirelessly powered modular toy, comprising: a light-emitting body, which comprises a first magnet, a second magnet and an induction coil, the first magnet and the second magnet are respectively positioned at a top and a bottom of the light-emitting body, an LED lamp is arranged at a top of the first magnet, and the induction coil is positioned between the first magnet and the second magnet; a power supply device, wherein the power supply device is provided with a transmitting coupling coil configured to couple electric energy into electromagnetic waves of a preset frequency; and wherein when the light-emitting body is placed on the power supply device, the light-emitting body receives electromagnetic waves from the transmitting coupling coil and converts the electromagnetic waves into electric energy to power the LED lamp.

Optionally, the wirelessly powered modular toy further comprises a detachable upper housing and a detachable lower housing, wherein the upper housing and the lower housing are spliced with each other to form an outer housing module with a hollow cavity, and the light-emitting body is arranged in the hollow cavity.

Optionally, a first mounting cavity for mounting the light-emitting body is formed in the lower housing, a first limiting groove is formed in a side edge of the second magnet, and a first limiting part is correspondingly convexly provided in the first mounting cavity.

Optionally, a second mounting cavity for mounting the light-emitting body is formed at a bottom of the upper housing, a second limiting groove is formed in a side edge of the first magnet, and a second limiting part is correspondingly convexly provided in the second mounting cavity, and wherein both the first limiting groove and the second limiting groove are semicircular grooves, and the first limiting part and the second limiting part are correspondingly configured as semicircular convex steps.

Optionally, the hollow cavity is of a circular structure, two side edges of the light-emitting body are straight edges, and the light-emitting body is internally connected to the hollow cavity.

Optionally, electrical terminals are further arranged at the top of the first magnet and located at one side of the LED lamp.

Optionally, connection posts are arranged at the bottom of the upper housing, and connection holes are arranged at corresponding locations at a top of the lower housing.

Optionally, the power supply device further comprises a power supply box, and an output end of the power supply box is electrically connected to the transmitting coupling coil.

Optionally, a plurality of connection bumps are arranged at a top of the upper housing, a connection groove is concavely provided at a bottom of the lower housing, and a connection pit for engaging with the connection bumps is convexly provided in the connection groove.

Compared with the prior art, the present utility model has the following beneficial effects: the present utility model provides a wirelessly powered modular toy which integrates light-emitting bodies into a plurality of outer housing modules that can be spliced with each other and improves the powering method of the toy, and benefiting from a wireless powering method, related powering structures have been simplified, and thus the splicing and assembling of structures are facilitated.

Meanwhile, the present utility model realizes wireless powering under electromagnetic induction principles, and children can intuitively see the phenomenon that electromagnetic induction generates electric current and the change of current intensity resulting from the distance change, fully learn about the knowledge contained therein and are educated through entertainment.

BRIEF DESCRIPTION OF THE DRAWINGS

In order to more clearly illustrate the technical schemes in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

Figure 1:
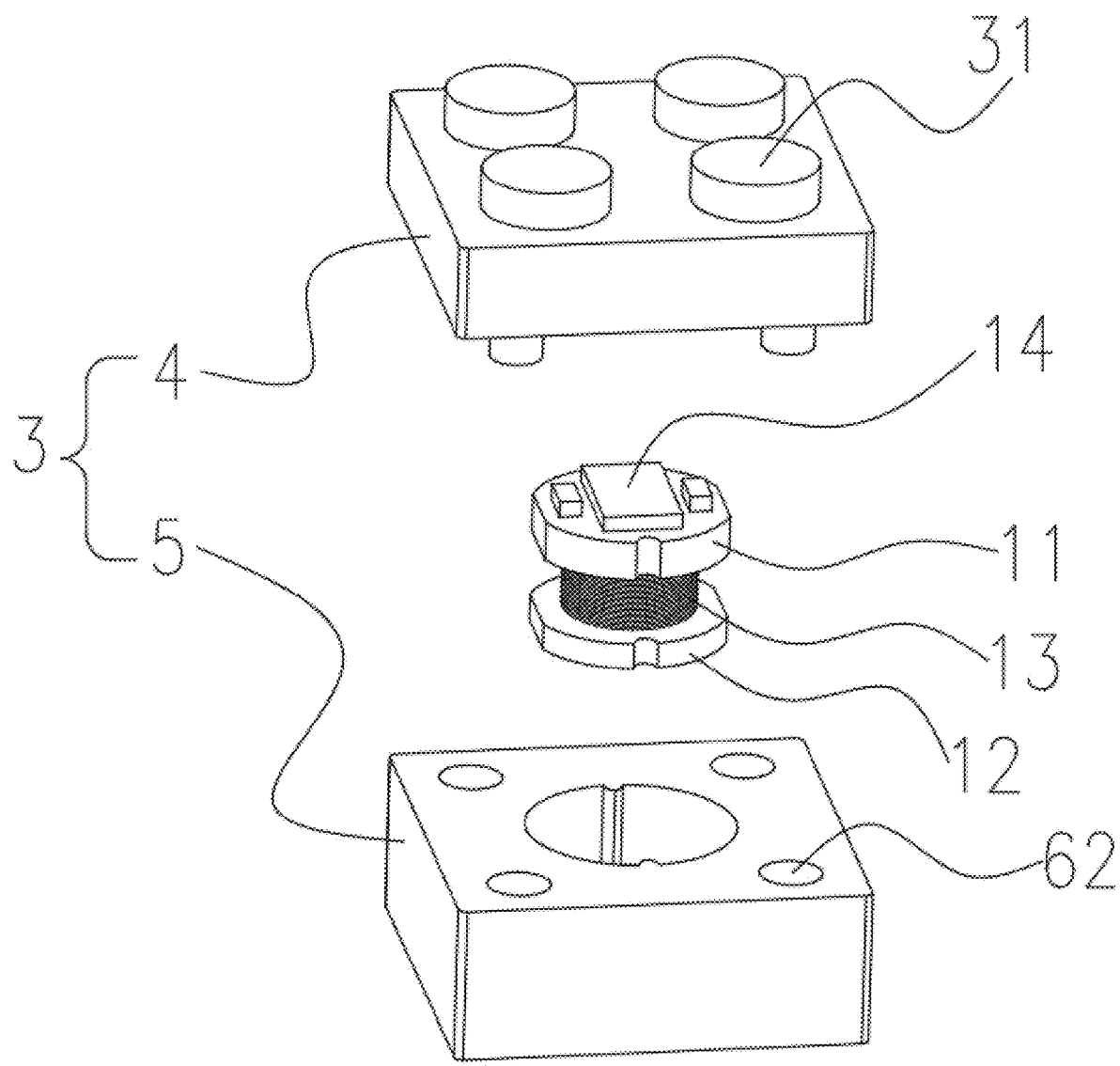
FIG. 1 is a schematic exploded view of structures of a light-emitting body and an outer housing module according to the present utility model.

The reference numbers in the drawings are indicated as follows.

1: light-emitting body; 11: first magnet; 111: second limiting groove; 12: second magnet; 121: first limiting groove; 13: induction coil; 14: LED lamp; 15: electrical terminal; 2: power supply device; 21: table top; 22: power supply box; 3: outer housing module; 31: connection bump; 32: connection pit; 33: connection groove; 4: upper housing; 41: second mounting cavity; 42: second limiting part; 5: lower housing; 51: first mounting cavity; 52: first limiting part; 61: connection post; and 62: connection hole.

The realization of the objectives, the functional features and advantages of the present utility model will be further explained in conjunction with the embodiments and with reference to the drawings.

DETAILED DESCRIPTION OF THE EMBODIMENTS

The technical schemes in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front and rear) are involved in the embodiments of the present utility model, the directional indications are only used to explain the relative position relationships, the motion situations and the like between individual components under a certain position (as shown in the drawings), and if the specific position is changed, the directional indications are changed accordingly.

In addition, if there are descriptions relating to "first", "second" and the like in the embodiments of the present utility model, the descriptions of "first", "second" and the like are for descriptive purposes only and are not to be construed as indicating or implying relative importance thereof or implicitly indicating the quantities of technical features indicated. Thus, a feature defined by "first" or "second" may explicitly or implicitly include at least one such feature. In addition, "and/or" appearing herein is meant to include three parallel aspects, and taking "A and/or B" as an example, it includes aspect A, or aspect B, or both aspect A and aspect B. In addition, the technical schemes among various embodiments may be combined with each other, but the combination must be based on that it can be realized by those of ordinary skill in the art, and when the combination of the technical schemes is contradictory or cannot be realized, such combination of the technical schemes should not be considered to exist, and is not within the protection scope of the present utility model.

Figure 2:
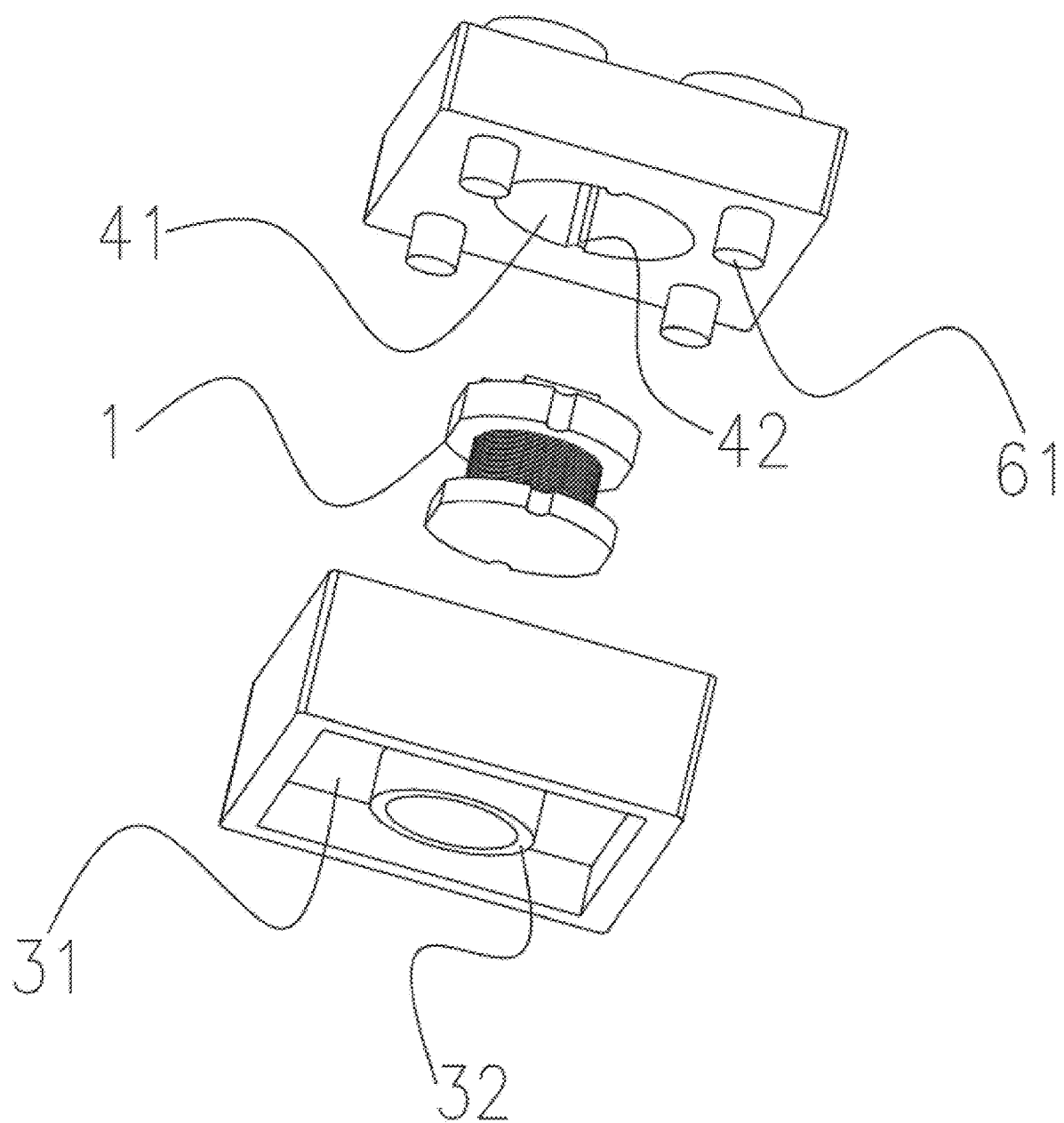
FIG. 2 is a schematic exploded view of structures of a light-emitting body and an outer housing module according to the present utility model viewed from another perspective.
Figure 3:
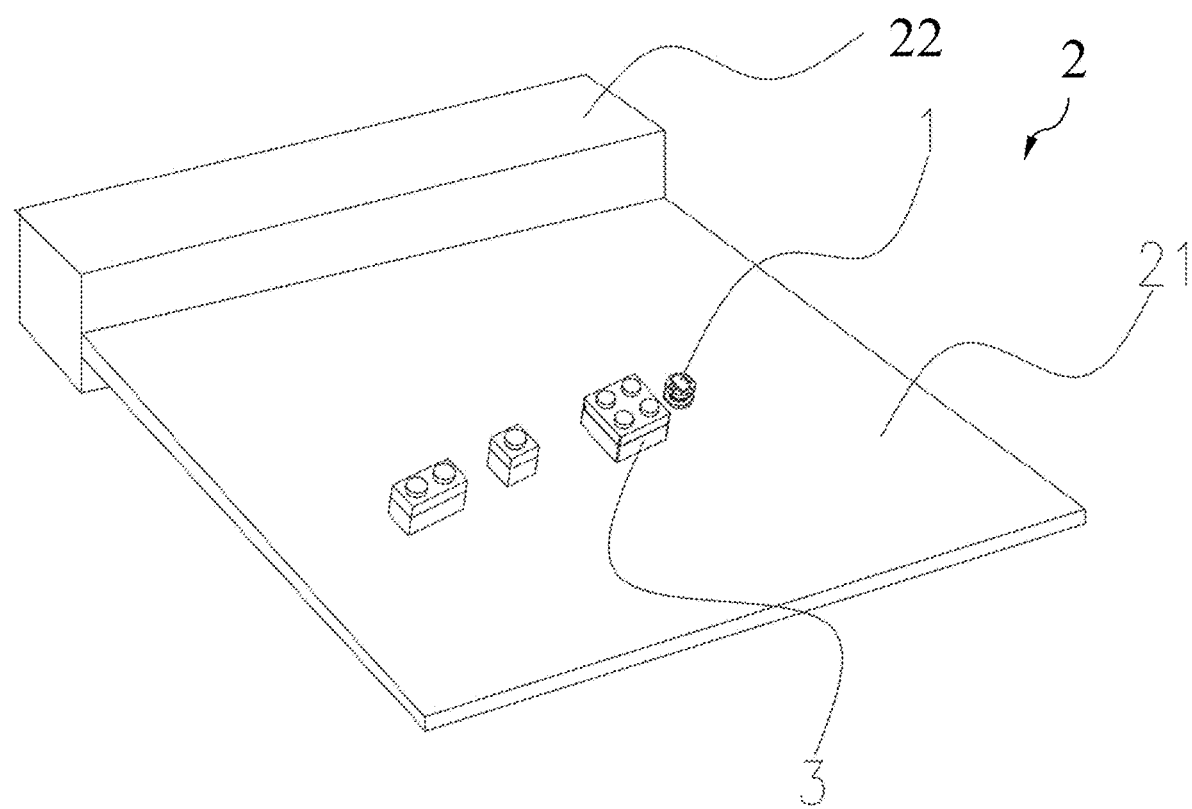
FIG. 3 is a schematic view of a structure of a wirelessly powered modular toy according to the present utility model.

Embodiments of the present utility model provide a wirelessly powered modular toy, and referring to FIGS. 1-3, the wirelessly powered modular toy comprises a power supply device 2 and a light-emitting body 1. The power supply device 2 comprises a table top 21 configured to place the light-emitting body 1, and a transmitting coupling coil (not shown) configured for wirelessly powering is further arranged inside the power supply device 2; and specifically, the power supply device 2 may obtain electric energy through an external power supply or a built-in power supply, and form electromagnetic waves through coupling of the transmitting coupling coil.

Further, referring to FIG. 1, the light-emitting body 1 is of a columnar structure, and the light-emitting body 1 comprises a first magnet 11, a second magnet 12 and an induction coil 13. The first magnet 11 and the second magnet 12 are respectively positioned at a top and a bottom of the light-emitting body 1, and the induction coil 13 is sleeved at a middle portion of the light-emitting body 1 and is positioned between the first magnet 11 and the second magnet 12. The first magnet 11 and the second magnet 12 have upper surface areas that are slightly greater than the portion where the induction coil 13 is sleeved, and therefore, the upper position and the lower position of the induction coil 13 are limited. An LED lamp 14 is arranged at a top of the first magnet 11.

The transmitting coupling coil forms electromagnetic waves through coupling and transmits the electromagnetic waves towards the light-emitting body 1, and the light-emitting body 1, as a conductor, senses the electromagnetic waves and realizes wireless powering under electromagnetic induction principles. In this way, the powering method of the modular toy is improved, and thus the powering structure of the modular toy is simplified. Meanwhile, through an intuitive expression of the LED lamp 14 shining, the modular toy, as a toy teaching aid, is also advantageous to make children learn about the phenomenon that electromagnetic induction generates electric current during the entertainment process, and cultivate children's understanding of the principles of wireless charging technology, and therefore, the children are educated through entertainment.

In one embodiment, referring to FIG. 1, the wirelessly powered modular toy further comprises an outer housing module 3, wherein the outer housing module 3 is a building block, and the outer housing module 3 with a hollow cavity is formed by a detachable upper housing 4 and a detachable lower housing 5 being spliced with each other. The outer housing module can have a structure provided in a variety of different shapes including, but not limited to bricks, plates, brackets, discs and wedges, to improve the playability and aesthetics of the toy. The hollow cavity is arranged inside the outer housing module 3, and the light-emitting body 1 is arranged in the hollow cavity.

Specifically, referring to FIG. 3, a plurality of the light-emitting bodies 1 may be provided, and the outer housing modules 3 may be designed as needed, and each of the outer housing modules 3 may be provided as a structure that can be detachably connected to each other, and specifically, at least one connection point is arranged on both the upper housing 4 and the lower housing 5 of each of the outer housing modules 3, and the connection point comprises a connection bump 31 and a connection pit 32. Splicing and assembling of the modular toy are facilitated by providing the outer housing modules 3, and thus the playability and aesthetics of the toy are improved.

In the illustrated embodiment, referring to FIGS. 1 and 2, four connection bumps 31 are arranged at a top of the upper housing 4, a connection groove 33 is concavely provided at a bottom of the lower housing 5, and one connection pit 32 for engaging with the connection bumps 31 is convexly provided in the connection groove 33. In a splicing state, the four connection bumps 31 pass through the connection groove 33, and the connection pit 32 is inserted and mated among the four connection bumps 31, so as to ensure a direct and stable connection of a plurality of the outer housing modules 3.

Figure 5:
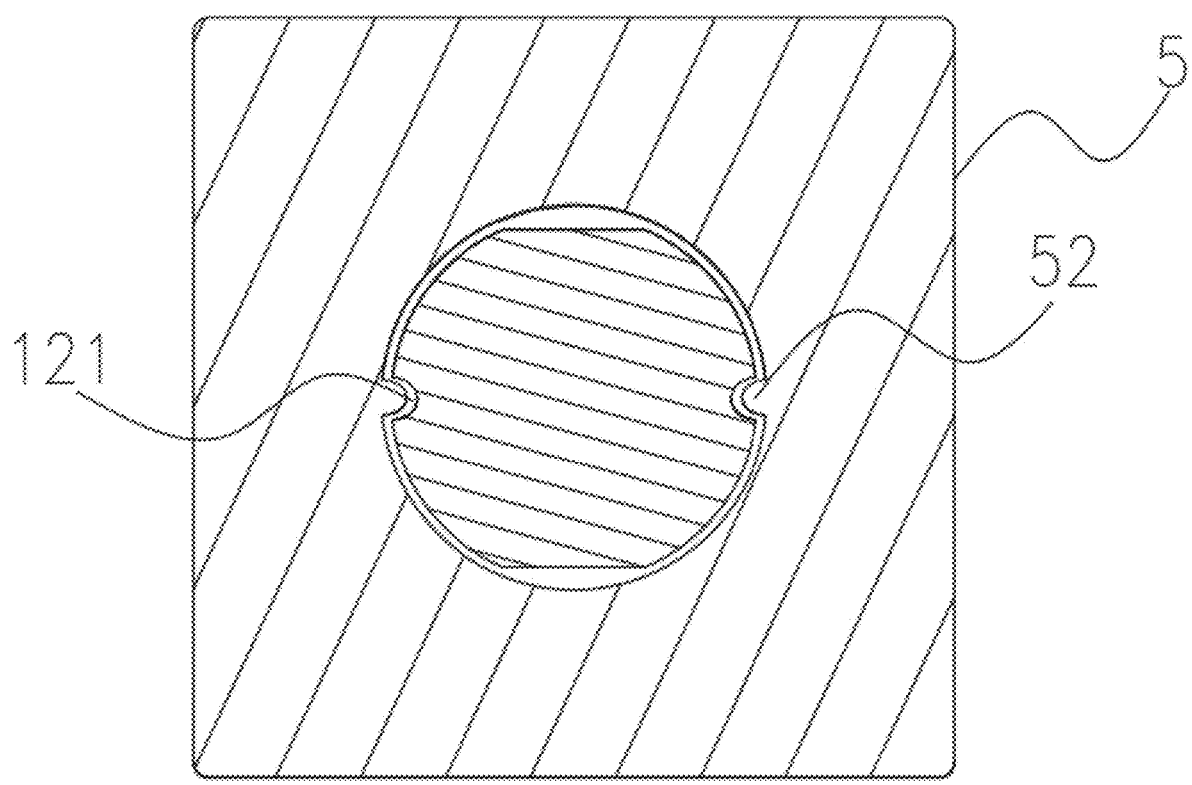
FIG. 5 is another cross-sectional view of a light-emitting body and an outer housing module according to the present utility model in an assembled state.

In one embodiment, referring to FIGS. 1 and 5, a first mounting cavity 51 for mounting the light-emitting body 1 is formed in the lower housing 5, a first limiting groove 121 is formed in a side edge of the second magnet 12, and a first limiting part 52 is correspondingly convexly provided in the first mounting cavity 51. When the light-emitting body 1 is placed in the first mounting cavity 51, the first limiting part 52 abuts against the first limiting groove 121, which ensures that the light-emitting body 1 is kept stably seated in the hollow cavity, wherein a plurality of the first limiting grooves 121 may be provided, and the first limiting parts 52 are provided corresponding to the first limiting grooves 121.

Figure 4:
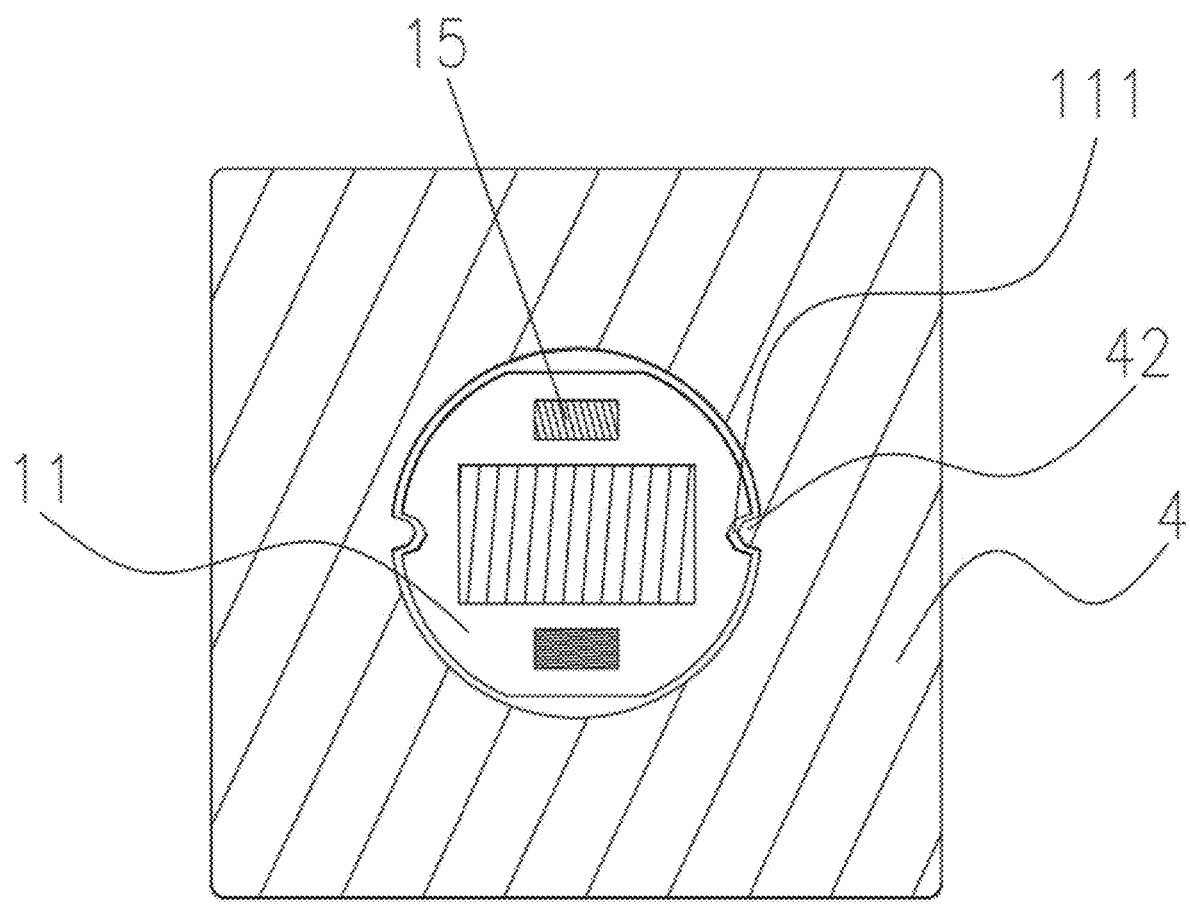
FIG. 4 is a cross-sectional view of a light-emitting body and an outer housing module according to the present utility model in an assembled state.

In one embodiment, referring to FIGS. 2 and 4, a second mounting cavity 41 for mounting the light-emitting body 1 is formed at a bottom of the upper housing 4, the first mounting cavity 51 and the second mounting cavity 41 are assembled to form the hollow cavity, a second limiting groove 111 is formed in a side edge of the first magnet 11, and a second limiting part 42 is correspondingly convexly provided in the second mounting cavity 41, and wherein both the first limiting groove 121 and the second limiting groove 111 are semicircular grooves, and the first limiting part 52 and the second limiting part 42 are correspondingly configured as semicircular convex steps. The structural design embodiment described in this embodiment is similar to the first embodiment, reference may be made to the corresponding design in the foregoing embodiment, and details are not described here. By providing the first limiting groove 121 to engage with the first limiting part 52, the top of the light-emitting body 1 is further limited to ensure its stable seating.

In the illustrated embodiment, referring to FIGS. 3 and 4, the present utility model provides an outer housing module 3 having two first limiting grooves 121 and two second limiting grooves 111. Design of the detachable outer housing module 3 has ensured the placement and accommodation of the light-emitting body 1, and meanwhile, the outer housing module 3 and the light-emitting body 1 are correspondingly provided with cooperating limiting parts, so as to better secure the light-emitting body 1, which prevents the light-emitting body 1 from shaking and misaligning or even getting dropped and lost when children play the toy, and improves the playability and safety of the toy.

In one embodiment, referring to FIGS. 4 and 5, the hollow cavity is of a circular structure, two side edges of the light-emitting body 1 are straight edges, and the light-emitting body 1 is internally connected to the hollow cavity. The side edges of the light-emitting body 1 do not directly abut against an inner wall of the hollow cavity, but are interfaced with arcs of the surface of the inner wall, so that a certain gap is reserved, and the light-emitting body 1 can be conveniently taken out by children.

In one embodiment, referring to FIGS. 1 and 4, electrical terminals 15 are further arranged at the top of the first magnet 11, and the electrical terminals 15 are located at one side of the LED lamp 14. By means of the electrical terminals 15, it can be ensured that various light-emitting components in each outer housing module 3 can be better electrically connected, so that the electric current generated by electromagnetic induction forms a closed loop among the various light-emitting components, and the simple structure of the terminals used as electrical connections will not affect the space occupation of the first mounting cavity 51.

In one embodiment, referring to FIGS. 1 and 2, cooperating connection parts are further arranged in the upper housing 4 and the lower housing 5, and in one illustrated embodiment, the connection parts are connection posts 61 and connection holes 62. The connection posts 61 are arranged at the bottom of the upper housing 4, and the connection holes 62 are arranged at corresponding positions at a top of the lower housing 5, thus the assembling and mounting of the outer housing module 3 are facilitated.

In one embodiment, referring to FIG. 3, the power supply device 2 further comprises a power supply box 22, and an output end of the power supply box 22 is electrically connected to the transmitting coupling coil. The power supply box 22 may be provided as a power adapter for an external power supply for powering, or may be provided as a battery mechanism with its own storage power supply, and the power supply box 22 outputs an alternating current of a preset frequency for the transmitting coupling coil, so that the transmitting coupling coil couples energy and emits electromagnetic waves.

In one preferred embodiment, the outer housing module 3 is made from a light-transmitting material, which includes but is not limited to frosted glass, light-permeable plastic and perspective glass, and the frosted glass can be used to change the amount of light passing through a light-permeable component, so as to form light with different degrees of brightness and darkness, thereby increasing the fun and variability. As an alternative embodiment, the outer housing module 3 may also be provided with light-transmitting holes (not shown) to facilitate light from the light-emitting body 1 to shine out.

The working principles are as follows: in specific implementations, the power supply device 2 is powered on, and the electric energy is coupled through the internal transmitting coupling coil and converted into electromagnetic waves; children only need to place the light-emitting body 1 or the light-emitting body 1 sleeved with the outer housing module 3 close to or on the power supply device 2, and then the light-emitting body 1 can generate electric current under the action of electromagnetic induction, thereby lighting up the LED lamp 14 on the light-emitting body 1. In this way, children can intuitively see the phenomenon that electromagnetic induction generates electric current and the change of current intensity resulting from the distance change, fully learn about the knowledge contained therein and are educated through entertainment.

Meanwhile, the present utility model integrates light-emitting bodies 1 into a plurality of outer housing modules 3 that can be spliced with each other, and children can change and transform the shapes of this modular toy, and benefiting from a wireless powering method, related powering structures have been simplified, and thus the splicing and assembling of structures are facilitated.

The above mentioned contents are only optional embodiments of the present utility model and are not intended to limit the patent scope of the present utility model, and under the inventive concept of the present utility model, the equivalent structural transformations made by using the contents of the specification and the drawings of the utility model, or direct/indirect applications to other related technical fields, are all included in the patent protection scope of the present utility model.

What is claimed is:

1. A wirelessly powered modular toy, comprising:
   a power supply device configured to couple electric energy into electromagnetic waves of a preset frequency;
   a light-emitting body, wherein the light-emitting body comprises a first magnet, a second magnet and an induction coil, the first magnet and the second magnet are respectively positioned at a top and a bottom of the light-emitting body, an LED lamp is arranged at a top of the first magnet, and the induction coil is positioned between the first magnet and the second magnet; and
   an upper housing and a lower housing that are detachable, wherein the upper housing and the lower housing are spliced with each other to form an outer housing module with a hollow cavity, the light-emitting body is arranged in the hollow cavity, and wherein a first mounting cavity for mounting the light-emitting body is formed in the lower housing, a first limiting groove is formed in a side edge of the second magnet, and a first limiting part is correspondingly convexly provided in the first mounting cavity
   when the light-emitting body is placed on the power supply device, the light-emitting body receives the electromagnetic waves and converts the electromagnetic waves into electric energy to power the LED lamp.

2. The wirelessly powered modular toy according to claim 1, wherein a second mounting cavity for mounting the light-emitting body is formed at a bottom of the upper housing, a second limiting groove is formed in a side edge of the first magnet, and a second limiting part is correspondingly convexly provided in the second mounting cavity, and wherein both the first limiting groove and the second limiting groove are semicircular grooves, and the first limiting part and the second limiting part are correspondingly configured as semicircular convex steps.

3. The wirelessly powered modular toy according to claim 1, wherein the hollow cavity is of a circular structure, two side edges of the light-emitting body are straight edges, and the light-emitting body is internally connected to the hollow cavity.

4. The wirelessly powered modular toy according to claim 3, wherein one or more connection bumps are arranged at a top of the upper housing, a connection groove is concavely provided at a bottom of the lower housing, and one or more connection pits for engaging with the connection bumps are convexly provided in the connection groove.

5. The wirelessly powered modular toy according to claim 1, wherein electrical terminals are further arranged at the top of the first magnet and located at one side of the LED lamp.

6. The wirelessly powered modular toy according to claim 1, wherein connection posts are arranged at a bottom of the upper housing, and connection holes are arranged at corresponding locations at a top of the lower housing.

7. The wirelessly powered modular toy according to claim 1, wherein the power supply device further comprises a power supply box.

8. The wirelessly powered modular toy according to claim 1, wherein the outer housing module is made from a light-transmitting material.

* * * * *